Figure 6:
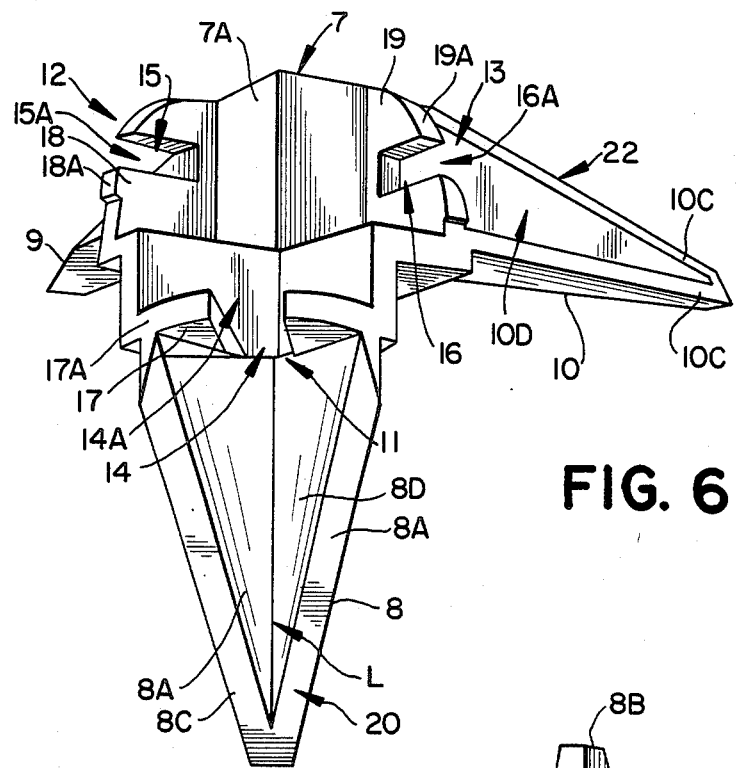

United States Patent [19]

Wåhlin

[11] Patent Number: 4,687,366
[45] Date of Patent: Aug. 18, 1987

[54] CORNER CONNECTING ARRANGEMENT

[76] Inventor: Olof Wåhlin, Hinsholmsgatan 7, S-421 77 Västra Frölunda, Sweden

[21] Appl. No.: 819,886

[22] PCT Filed: Feb. 20, 1985

[86] PCT No.: PCT/SE85/00086
§ 371 Date: Nov. 19, 1985
§ 102(e) Date: Nov. 19, 1985

[87] PCT Pub. No.: WO85/04693
PCT Pub. Date: Oct. 24, 1985

[30] Foreign Application Priority Data

Apr. 11, 1984 [SE] Sweden .............................. 8402004

[51] Int. Cl.⁴ .............................................. F16B 7/00
[52] U.S. Cl. .................................... 403/297; 403/172; 403/295
[58] Field of Search .............. 403/297, 171, 172, 176, 403/295

[56] References Cited

U.S. PATENT DOCUMENTS 3,545,796 12/1970 Nicholls ........................ 403/297 X
4,078,276 3/1978 Nunes ............................ 403/297 X
4,101,229 7/1978 Weibull .............................. 403/171
4,464,076 8/1984 Leibhard ............................ 403/297

FOREIGN PATENT DOCUMENTS 935434 8/1963 United Kingdom ................ 403/297

Primary Examiner—Andrew V. Kundrat
Attorney, Agent, or Firm—Balogh, Osann, Kramer, Dvorak, Genova & Traub

[57] ABSTRACT

A corner connecting arrangement for lengths of profile or similar elements which are provided with cavities and can be connected at an angle to each other, and which can be releasably connected by means of connecting devices. The invention makes it possible to connect together lengths of profile, etc. which have a cavity, at an angle to each other irrespective of the cross-section shaping of the said cavity. A connecting piece which has at least two projections disposed at an angle to each other extending out from a common intermediate part and provided with a sloping connecting surface, is provided with an abutment surface appertaining to each of the projections which is designed to co-act with a corresponding screw device which can co-act with a wedging element which can be displaced over the connecting surface of the said connecting piece and which is designed to move over the said connecting surface when the associated screw device is screwed in or out, thereby increasing the effective width of the projections in one screwing direction in order to achieve clamping co-action with the length of profile, and reducing the said width in the opposite screwing direction in order to effect disengagement.

5 Claims, 7 Drawing Figures

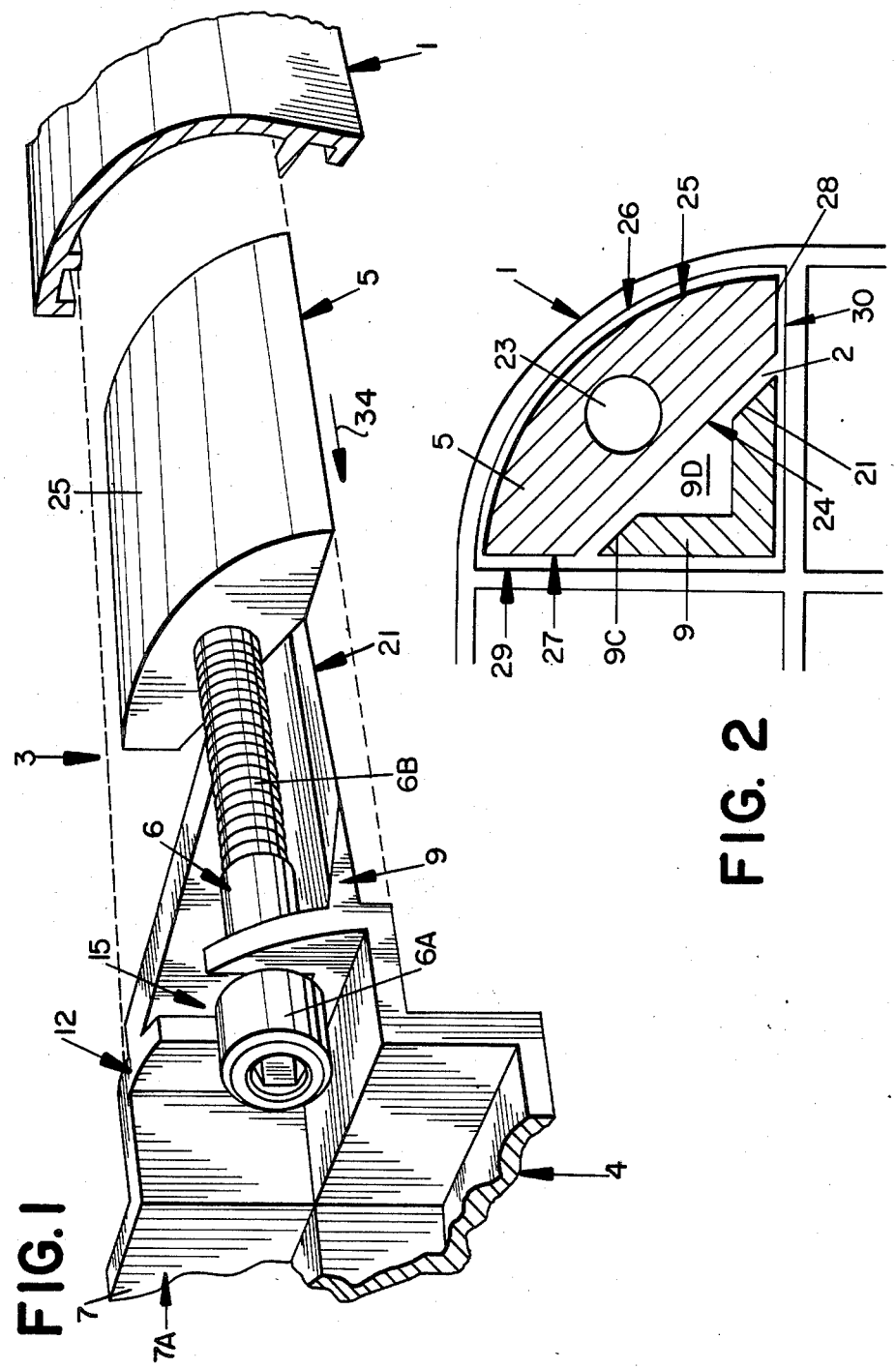

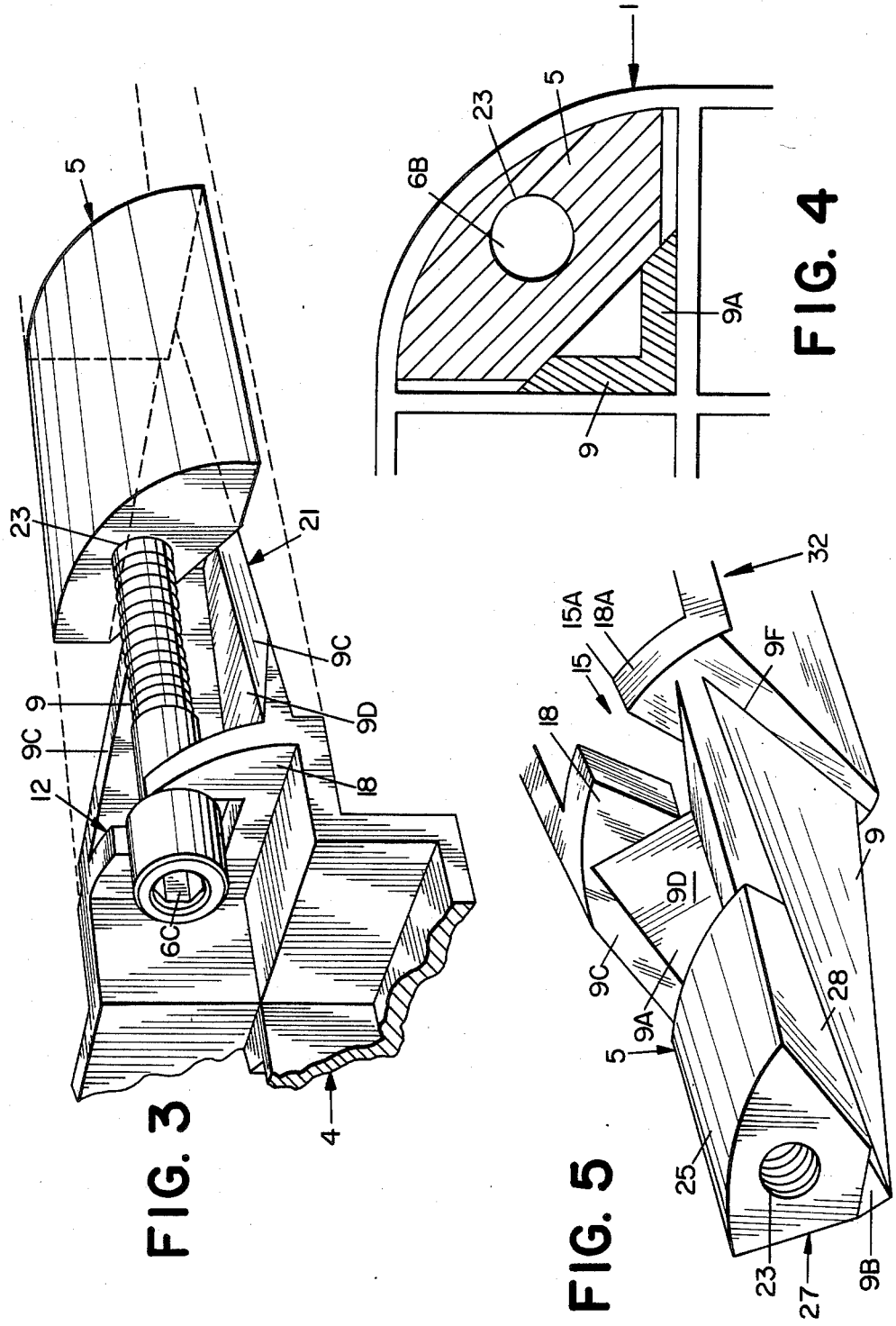

CORNER CONNECTING ARRANGEMENT

The present invention relates to a corner connecting arrangement for lengths of profile or similar elements which are provided with cavities and can be connected at an angle to each other, and which can be connected releasably by means of connecting devices.

The main object of the present invention is primarily to provide an arrangement of the above-mentioned kind which makes it possible to connect together lengths of profile or similar elements which have a cavity extending either continuously or at intervals in the longitudinal direction of the elements, at an angle to each other irrespective of the cross-section shaping of the said cavity, simply and effectively and so that they can be released easily again.

The said object is achieved by means of an arrangement according to the present invention which is essentially characterised in that a connecting piece, which has at least two projections disposed at an angle to each other extending out from a common intermediate part and provided with a sloping connecting surface, is provided with a sloping connecting surface, is provided with an abutment surface appertaining to each of the projections which is designed to co-act with an appropriate screw device which can co-act with a wedging element which can be displaced over the connecting surface of the said connecting piece and is designed to move over the said connecting surface when the associated screw device is screwed in or out, thereby increasing the effective width of the projection in one screwing direction in order to achieve clamping co-action with the length of profile, and reducing the said width in the opposite screwing direction in order to effect disengagement.

Figure 7:
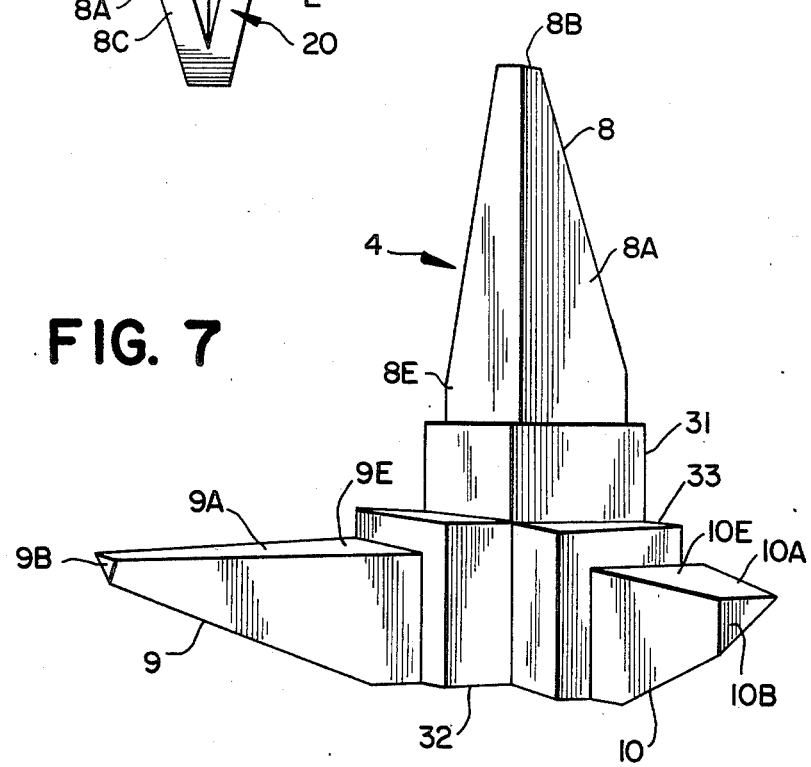

The invention is described below by way of a preferred embodiment example, with reference to the accompanying drawings, on which FIG. 1 is a cut away perspective view of part of a corner connecting arrangement designed according to the invention, ready for connection, FIG. 2 is a cross-section through the arrangement in the said state, FIG. 3 again shows a cut away perspective view of part of the said arrangement, disposed in a connecting state, FIG. 4 is a cross-section through the arrangement in the said connecting state, FIG. 5 is a perspective view of part of the arrangement in the assembled state, looking at an angle from the front, FIG. 6 is a perspective view of a connecting piece appertaining to the arrangement, and FIG. 7 is a perspective view of the connecting piece from the diametrically opposite side.

According to the invention it is proposed to use a corner connecting arrangement 3 which comprises a connecting piece 4, a number of wedging elements 5 and a number of screw devices 6 in order to make it possible to connect together at an angle to each other and so that they can be released easily a number of lengths of profile 1 or similar elements which have a cavity 2 extending in the longitudinal direction of the profile or element. A connecting piece 4 comprises a plurality of, and at least two, projections 8, 9, 10 extending out from a common intermediate part 7 at the desired angle relative to each other. In the example shown on the drawings the said projections 8–10 extend at right angles from the intermediate part 7, in the manner of X, Y and Z co-ordinates, respectively.

Each projection 8–10 has an abutment surface 11, 12, 13 appertaining to it, preferably consisting of a slit 14–16 extending through a wall element 17–19 disposed transverse to the longitudinal direction of its respective projection and the outer face 17A–19A of which is expediently curved. Expediently, the said respective slits 14–16 are open at one end 14A, 15A, 16A and extend at an angle to the inner central longitudinal plane L of the associated projection. To enable the connecting piece 4 to be cast in one piece, for example in a plastic material, the slits 15, 16 are expediently disposed at two of the abutment surfaces 12, 13 to extend at an angle such that the said slits 15, 16 are substantially at right-angles to a wall element 9A, 10A appertaining to the projections 9, 10, while the slit 14 at the remaining abutment surface 11 is designed to extend at an angle of approximately 45° relative to a wall element 8A on the projection 8.

The said wall elements 8A, 9A, 10A are expediently designed to extend with both their respective interiors and their exteriors at right-angles to each other on the respective associated projections 8–10, in that the projections 8–10 have a channel-shaped, preferably V-shaped cross-section with the height reducing in the direction of the free ends 8B, 9B, 10B of the projection, which are preferably planar.

The respective projections 8–10 have a sloping connecting surfacee 20, 21, 22, preferably a wedge-shaped connecting surface which extends from the free ends 8B–10B of the projections towards the associated abutment surfaces 11–13, with an increasing slope. The embodiment example illustrated shows that the connecting surfaces 20–22 are formed by the free edge surfaces 8C–10C on the wall elements 8A–10A, but naturally they may consists of a larger surface which covers the respective inner cavities 8D–10D in the projections.

A wedging element 5 serving as a connecting device is designed to be connected by a screw device 6 to the above-mentioned abutment surface 11–13 on the respective projection 8–10 which it is desired to connect to a suitable length of profile 1 provided with a cavity. The said screw device 6 id designed to be received with its head part 6A and its threaded part 6B in the respective faces of the said wall elements 17–19, in the hollow space 8D–10D in the respective projections 8–10 as shown in FIGS. 1 and 3 on the drawings. The threaded part 6B of the screw device 6 is designed to be received by and co-act with a corresponding fixed part 23 for a screw device 6, preferably a tapped through-bore 23 in the respective wedging element 5, with a view to making possible the desired movement of the wedging element 5 towards and away from the associated abutment surface 11–13 when the screw device 6 is screwed in one direction or the other.

The wedging element 5 is formed by a body which has a sloping complementary connecting surface 24 which is adapted to fit the said connecting surface 20–22 on the respective projections 8–10; this surface 24 extends at an angle relative to the said tapped bore 23 extending through the wedging element 5. Expediently, the width of the said complementary connecting surface 24 increases in the direction from its free end 8B–10B towards the intermediate part 7, by making it wedge-shaped, for example, and it is preferably substantially planar.

The side surface 25 of the wedging element 5 which faces away from the complementary connecting surface 24 is curved in the example shown, with the aim of, amongst other things, making it possible to connect together releasably profiles 1 which have an internally arched wall surface 26 in the profile cavity.

The edge surfaces 27 and 28 located on either side of the complementary connecting surface 24 are disposed substantially at right-angles to each other and are preferably planar, with a view to providing a locking effect with the planar wall surfaces 29 and 30 on the lengths of profile 1, which have a few, three, four or more separate wall surfaces.

The intermediate part 7 is expediently open at the rear 7A with a view to providing easy access to the said intermediate part 7 in the connected state. A spacer device 31-33 can be provided for the connecting piece 4 at the inner ends 8E-10E of the respective projections, and has the role of holding the lengths of profile 1, etc. at the desired distance from each other in the connected state. The said rear side can be covered over by means of a cover which can be connected easily, for example a snap-on cover.

Connection by means of the said above-described corner connecting arrangement 3 is accomplished by connecting a wedging element 5 with a screw element 6 screwed into the associated screw hole 23 to the desired projection 9 which it is intended to connect releasably to a length of profile 1, etc. by inserting the screw element 6 transverse to its longitudinal direction, through the associated slit 15 in the abutment surface 12 appertaining to it, with the connecting surface 21 and the complementary surface 24 laid against each other as shown in FIGS. 1, 2 and 5. When the screw element 6, which may consist of a screw with a hexagonal recess 6C, is screwed in with a suitable key, etc. in the direction away from the intermediate part 7 of the connecting piece so that the threaded part 6B of the screw element 6 is urged to screw into the screw hole 23 in the wedging element 5, the said element 5 is urged to move in the direction of the arrow 34, towards the intermediate part 7, with the element 5 sliding via its surface 24 over the corresponding connecting surface 21. The effective width of the projection 9 and the element 5 is thereby increased, as shown in FIGS. 3 and 4, so that the surface 25 of the element 5 is pressed against the curved inner surface 26 in the actual length of profile 1 and the outer faces 27, 28 of the wall element 9A of the projection come to rest against the planar internal surfaces 29, 30 situated in the length of profile 1. Effective wedging of the element 5 and the projection 9 in the cavity 2 in the profile 1 is accomplished when the screw element 6 is tightened to the maximum. Disengagement and release of the length of profile 1 from the connecting piece 4 is accomplished by screwing the screw element 6 in the opposite direction to that indicated above.

Further connecting of other lengths of profile 1 which are to be connected to the other projections 8 and 10 respectively of the connecting piece is effected in the same way as described above.

The invention is not limited to the embodiment example described above and shown on the drawings, but may be modified within the frame-work of the Patent Claims without exceeding the scope of the invention.

I claim:

1. A connection piece for releasably connecting profile elements having internal cavities at an angle to each other, said piece comprising an intermediate part, at least two projections extending from said part, each projection having a sloping surface, each projection extending from a respective wall element of said intermediate part, an aperture in each wall element, a wedge element associated with each projection and having a sloping surface complementarily formed to the sloping surface of said projection, and a screw device extending through said aperture and threadedly engaged with said wedge element, whereby when said screw device is operated to work with sloping surfaces against each other, the wedge element is forced against internal walls of the profile element to releasably secure said profile element to said intermediate part, wherein said aperture comprises a slit which extends through said wall element disposed transverse to the longitudinal extent of the projection, and which is arranged on the respective sides to receive a main part and the threaded part, respectively, of the screw device.

2. A connecting piece according to claim 1, characterized in that the slits are open at one end and extend at an angle to an inner cavity of the associated projection.

3. A connecting piece according to claim 1, characterized in that the width of the complementary connecting surface increases in the direction away from one of its ends.

4. A connecting piece according to claim 1, characterized in that one surface of the wedging element is curved.

5. A connecting piece according to claim 1, characterized in that edge surfaces situated on either side of the complementary connecting surfaces are disposed substantially at right-angles to each other.

* * * * *